Sept. 18, 1951  B. WELTE  2,568,528
VALVE AND HYDRAULIC CIRCUIT THEREFOR
Filed Aug. 5, 1944  4 Sheets-Sheet 1
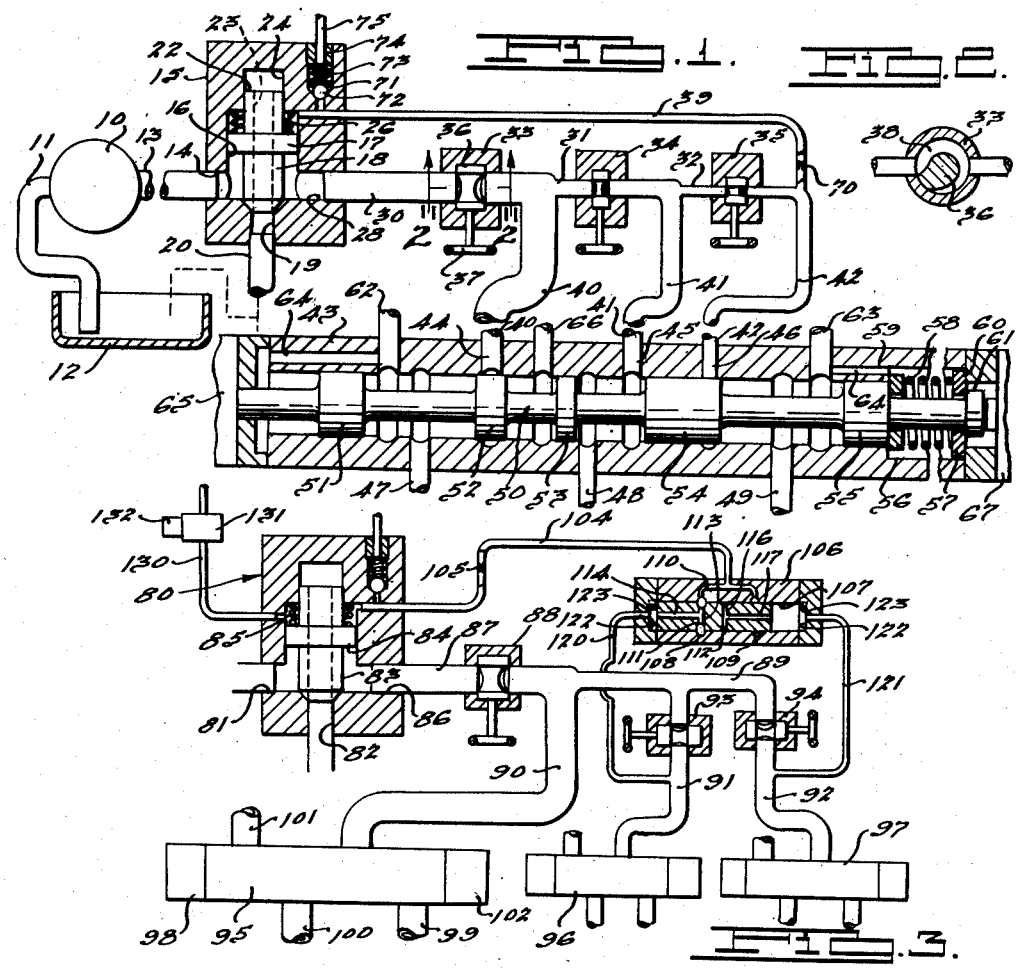

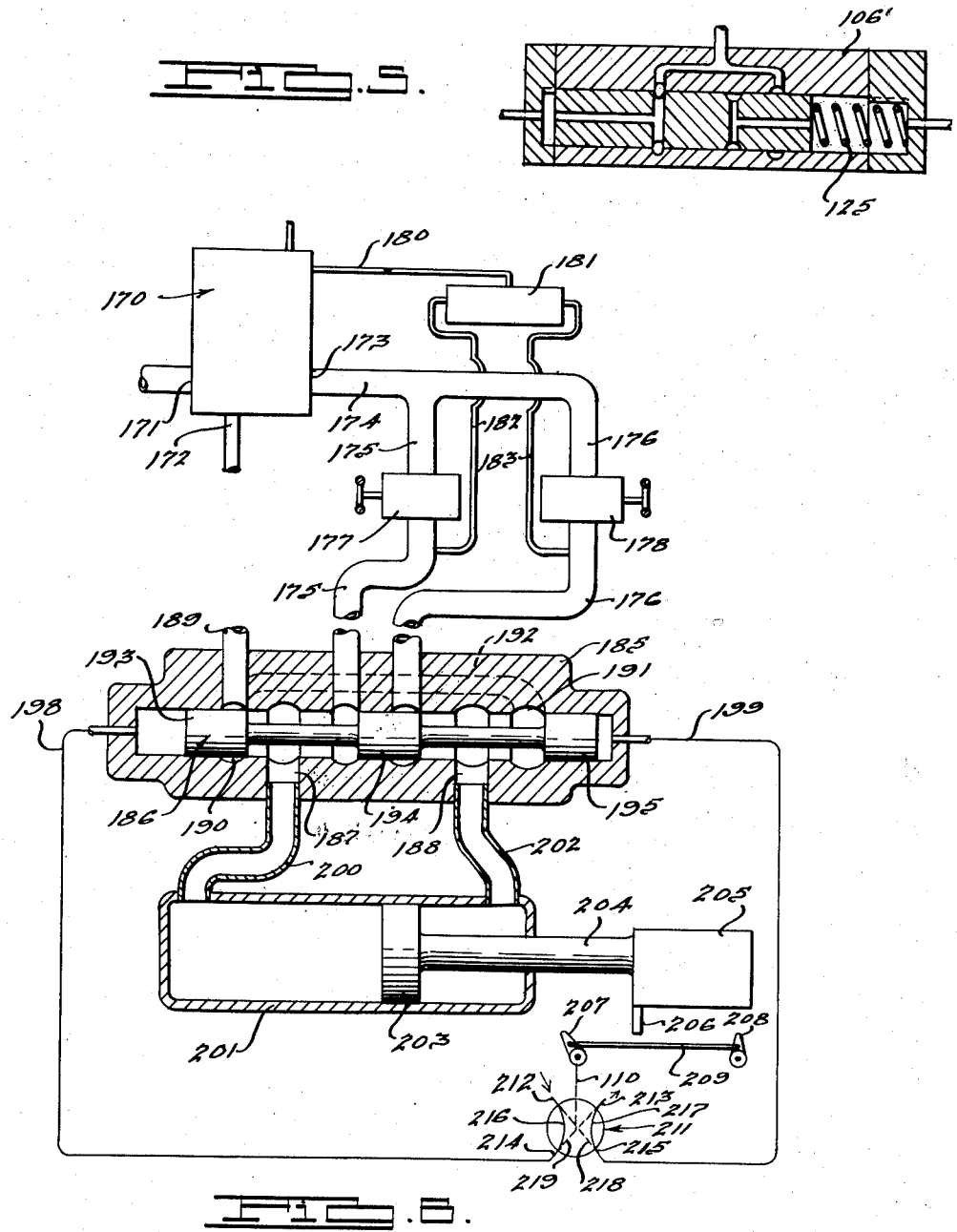

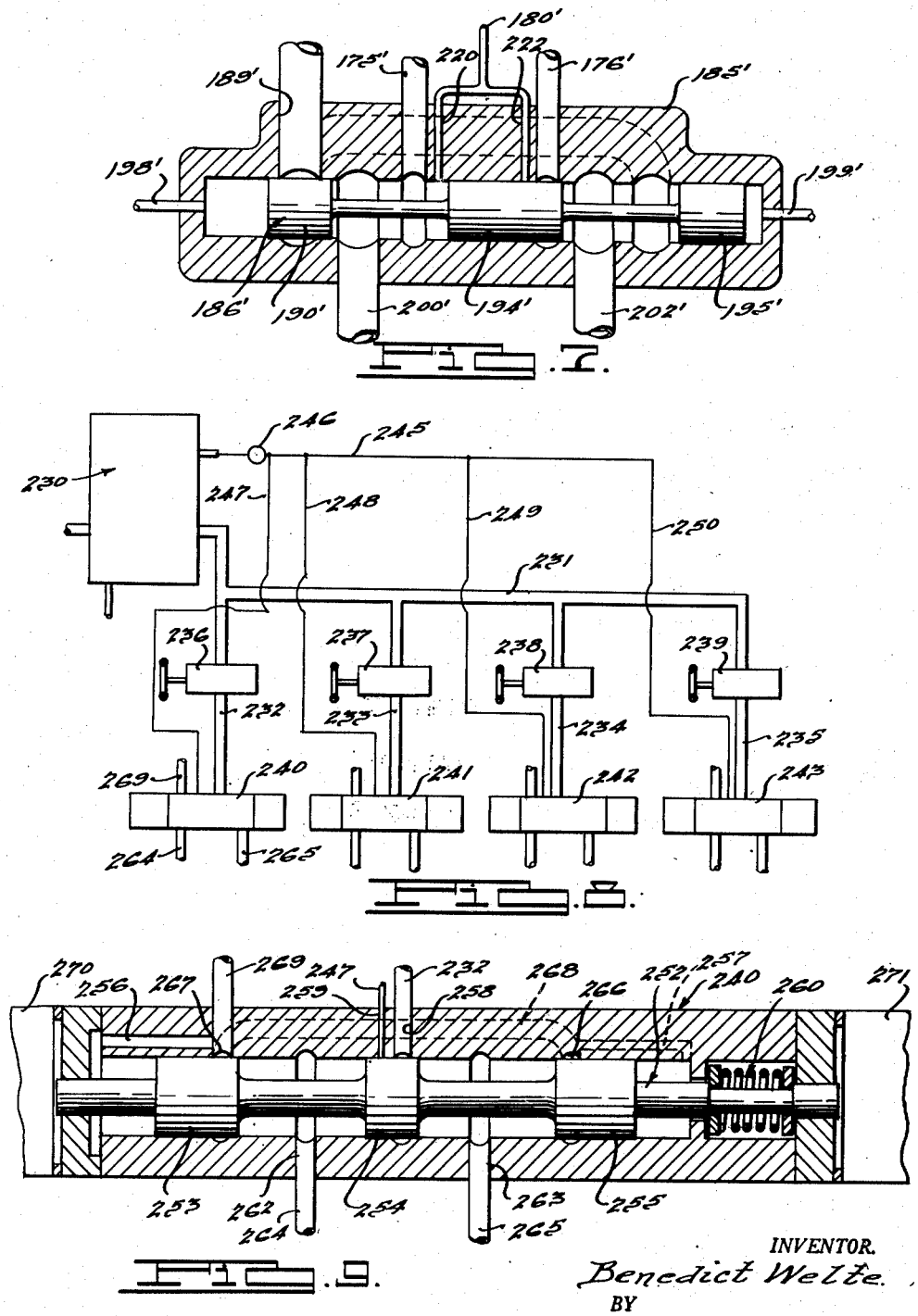

INVENTOR.
Benedict Welte.
BY
Harness, Dickey & Pierce
ATTORNEYS.

Patented Sept. 18, 1951

2,568,528

UNITED STATES PATENT OFFICE 2,568,528

VALVE AND HYDRAULIC CIRCUIT THEREFOR

Benedict Welte, Lake Orion Township, Oakland County, Mich., assignor to Colonial Broach Company, Detroit, Mich., a corporation of Delaware Application August 5, 1944, Serial No. 548,294

16 Claims. (Cl. 137—166)

1

The present invention relates to a multiple flow control valve mechanism for use in hydraulically operated machinery incorporating a constant displacement pump and two or more liquid passages to which the liquid discharged by the pump is supplied in succession, which mechanism serves to automatically and independently control the rate of flow through each passageway independently of the pressure and without subjecting the pump to any appreciable pressure in excess of that required to effect the desired rate of flow through each passageway.

It has been proposed that a plurality of constant displacement pumps of varying capacities be used singly or in various combinations during the operation of different motors of a machine or during different portions of the movement of one motor in order to control the speeds at which the motors operate, but such an arrangement is expensive, not only because of the cost of the additional pumps but because of the need for additional control means to throw the various pumps into and out of operation.

The speed of operation of several motors which are driven from a single positive displacement pump has also been controlled by means of by-pass relief valves in combination with a throttle or restriction valve for each motor; but the difficulty with such arrangements is that the pump must operate continuously against the pressure setting of the relief valve, which in turn must be the maximum pressure required for operating any of the motors. Since such high pressure is seldom required an excessive waste of power and heating of the liquid results. Likewise the speed of the motors varies with the mechanical resistance encountered.

Flow control valves have been used which, by means of a by-pass valve, transmit a fixed volume of liquid per minute independent of the resistance offered by the operating motor. These valves are adjustable for different flow rates and have the advantage of maintaining a constant motor speed and automatically varying the discharge pressure of the pump to that required to maintain the motor in operation at the desired speed, thus reducing waste of power and heating of the liquid. However, prior valves of this type cannot be used to control the speed of two or more operating motors having different volumetric capacities, and many hydraulically operated machine tools and presses employ two or more motors of different capacities, nor can they operate a single motor at two different speeds during different portions of its stroke. As

2 a result, if the flow control valve is set to maintain one of a plurality of motors at the desired speed the others will operate at improper speeds, and any adjustment to change the speed of operation of the first motor changes the speed of all motors.

In applicant's copending application, Serial No. 495,856, filed July 23, 1943, now Patent No. 2,395,702, dated February 26, 1946, is disclosed a flow control system for three motors embodying a flow control valve of the type mentioned above, which controls the rate of flow to the largest of the three motors, in combination with means for causing said valve to operate as an ordinary fixed pressure-relief valve at a lower pressure during operation of the other two motors. This arrangement has the advantage of reducing the pump discharge pressure to a level below the usual overload or safety-relief valve pressure during the operation of auxiliary motors which do not require a high pressure, but it does not provide means to adjust the speed of the secondary motors and, moreover, the speed of those motors will vary with the resistance encountered.

Accordingly, it is the general object of this invention to provide several practical forms of a multiple flow control valve mechanism for use with a single constant displacement pump, which mechanism will automatically maintain the speed or rate of flow of liquid through each of a plurality of successively operated passageways at any desired level, subject to independent adjustment of the rate of flow through each passageway, and which will automatically limit the discharge pressure of the pump to approximately that required to effect the desired rate of flow through each passageway regardless of variations in the mechanical resistance offered to such flow by the posiitve displacement motors connected to the passageways.

Other objects of the invention, which include the provision of such a flow control valve mechanism and control circuits therefor which are exceedingly simple in construction, inexpensive to manufacture, and practical in operation, will become apparent from the following specification, the accompanying drawings, and the appended claims.

Figure 1 is a diagrammatic view of one form of the flow control valve mechanism.

Figure 2 is a fragmentary sectional view taken on the line 2—2 of Figure 1.

Figure 3 shows diagrammatically a modified form of the invention.

Figure 4 shows a further modified form of the invention.

Figure 5 is a sectional view of one type of low-pass valve employed in the system illutrated in Figure 4.

Figure 6 illustrates diagrammatically an application of the flow control mechanism to the operation of a single piston and cylinder unit in which an independent control of the speed of operation of the piston in each direction is provided.

Figure 7 is a sectional view of a modified form of valve adapted to be used in the system illustrated in Figure 6.

Figure 8 illustrates diagrammatically a further modified form of the invention.

Figure 9 illustrates one of the spring centered four-way valves employed in the system illustrated in Figure 8.

Figure 10:
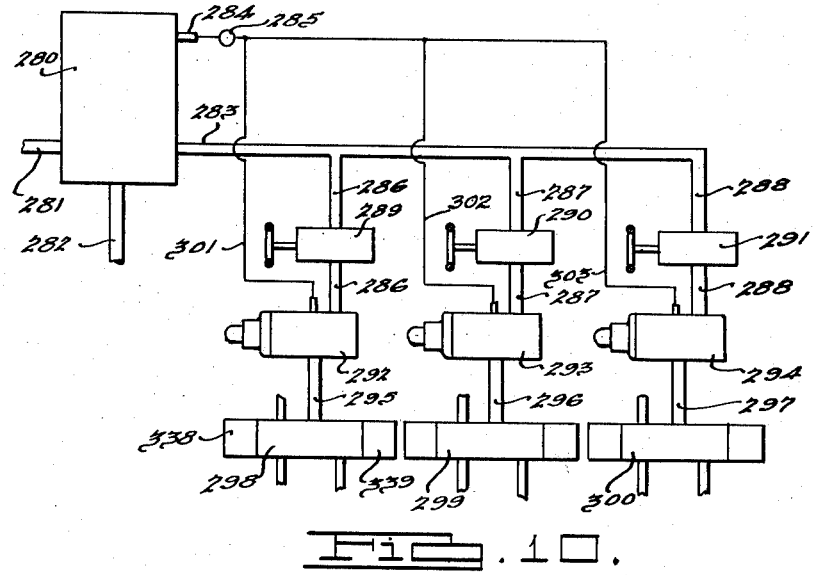
Figure 10 is a diagrammatic illustration of a further modification of the invention.

Referring to Figure 1 there is illustrated one example of a flow control mechanism adapted to control the rate of flow of liquid to each of three positive displacement motors, not shown. The mechanism includes a constant displacement pump 10 having an inlet conduit 11 communicating with a liquid reservoir 12. The detailed construction of the pump forms no part of the present invention but it should be understood that the invention is intended for use with constant displacement pumps; i. e., positive displacement pumps which deliver a constant volume of liquid for each unit of time.

The discharge outlet 13 of the pump is connected to an inlet port 14 of a valve housing 15. The valve housing is formed with an interior generally cylindrical chamber 16 in which is slidably fitted a piston 17, fastened to a valve plunger 18. The valve plunger 18 controls a discharge port 19 which is connected by means of a conduit 20 to the low pressure reservoir 12. Piston 17 has an upward projection 22 of the same diameter as the plunger 18, and the entire plunger and piston element, including the projection 22, is provided with a central bore 23, which extends throughout the unit. The projection 22 fits within a reduced cylindrical recess 24 in the housing. The tapered end of the plunger is preferably tapered at a slightly greater angle than that of the tapered seat, in accordance with usual practice, so that the seating engagement occurs at the maximum diameter of the plunger. As a result of this arrangement the piston and valve plunger unit is balanced against the influence of any pressure within the outlet port 19 or the recess 24.

The upper side of the piston 17 is subject to a downward force exerted by the spring 26 which normally acts to hold the valve plunger 18 in the position in which it closes the outlet port 19. The spring 26 is preferably of such stiffness that it will be overcome by a pressure beneath the piston 17, which is approximately twenty pounds per square inch in excess of the pressure within the chamber 16 above the piston 17 for a hydraulic system having a maximum operating pressure in the order of 1000 pounds per square inch. This ratio may be varied widely, it being sufficient to note only that the differential pressure required to overcome the spring 26 should preferably be a small proportion of the maximum operating pressure of the system. In addition, the design and arrangement of the spring, indicated only diagrammatically in Fig. 2, should be such that little change in the spring pressure occurs on movement of the plunger 18 from fully closed to fully open position.

The valve housing is provided with an outlet port 28 which is in constant communication with the inlet port 14 and, consequently, with the outlet of the pump 10, regardless of the position of the valve plunger 18. The outlet port in turn is connected to three conduits 30, 31, and 32 which are connected in series and which, in the particular embodiment illustrated, are of progressively reduced size. Each of these three lines contains an adjustable throttle valve. Thus the line 30 contains a throttle valve 33, the line 31 contains a throttle valve 34, and the line 32 contains a throttle valve 35. These three valves are identical in construction, although also of progressively reduced size, and hence a description of the internal construction of the valve 33 will suffice for all.

As best shown in Figures 1 and 2, the valve 33 comprises a housing containing a generally cylindrical rotatable plug 36, the rotative position of which may be adjusted by handle 37. The plug 36 is provided intermediate its ends with a circumferential groove 38, which extends almost but not entirely around the circumference of the plug 36 and which is of progressively diminishing depth. As a result of this arrangement, counterclockwise rotation of the valve plug 36, as viewed in Figure 2, will progressively diminish the aperture for passage of fluid from the inlet to the outlet port of the valve. The groove 38 is so proportioned as to provide a relatively small resistance to the flow, and the configuration is such that it provides smooth, Venturilike flow passages, and hence may be regarded as an adjustable Venturi opening. It should be understood that the particular form of adjustable throttle valve, while preferred, is not necessary to the invention, as ony form of adjustable throttle valve, or in some cases even a fixed restriction, may be employed.

The extremity of line 32 is connected by means of a small pipe line 39 to the valve chamber 16 at a point located above the piston 17, thus subjecting the upper side of the piston 17 to the pressure existing in the system beyond the three adjustable restriction valves 33, 34, and 35.

Three branch lines 40, 41, and 42 are connected respectively to the lines 30, 31, and 32 at points beyond the adjustable restriction valves in the latter lines. The three lines 40, 41, and 42 may be connected in any suitable manner to three operating motors of the hydraulic system. It is essential to the successful operation of the present invention that the hydraulic system, in which the present multiple flow control mechanism is employed, incorporate means to insure that normal flow occurs in only one of the lines 40, 41, and 42 at a time. As a general rule this will be accomplished by blocking valves, the nature and sequence of operation of which will depend upon the particular machine in which the system is employed. However, it may be accomplished in any other manner, as hereinafter indicated.

For the purposes of illustration there is shown in Figure 1 a single three-position, solenoid-operated valve which is effective to permit flow through only one of the lines 40, 41, and 42 at a time. This valve includes a housing 43 provided with three pressure ports 44, 45, and 46 connected respectively to the lines 40, 41, and 42, and three outlet ports 47, 48, and 49, which may be connected respectively to three operating motors of the system. The valve is provided with a spool, indicated generally at 50, having a plurality of lands 51, 52, 53, 54, and 55. The spool is provided with a conventional spring centering device comprising a pair of annular washers 56 and 57, which are forced apart by spring 58. Since the washer 56 bears against a shoulder 59 in the housing and against the spool 55, and the washer 57 bears against the end wall 60 of the housing and a shoulder 61 on the valve spool, the washers and spring serve to hold the valve spool in the central position illustrated. In this position line 41 is in communication with line 48, line 40 is blocked by land 52, and line 42 is blocked by land 54. At the same time the motor line 47 is connected to a line 62 while the motor line 49 is connected to a line 63. The lines 62 and 63 in turn are connected to the low-pressure reservoir 12.

When the solenoid 65 is energized the spool 50 is shifted to the right to a position in which line 41 is blocked by reason of the fact that the land 53 blocks the motor line 48 which is the only outlet in communication with the inlet port 45. Line 42 remains blocked by spool 54, but line 40 is connected to the motor line 47. At this time the motor line 48 is connected to the tank line 66. When the spool is shifted to the left by energizing solenoid 67, line 42 is connected to the motor line 49, line 41 is blocked by spool 54, and line 40 is blocked by spools 52 and 53. At the same time line 47 remains connected to the low pressure line 62, line 48 is connected to the low pressure line 66 and the low pressure line 63 is blocked by land 55. It is apparent, therefore, that in each of the three positions of the spool two of the lines 40, 41, and 42 are blocked and the motor lines associated with the blocked lines are connected to the low pressure valve reservoir. Drain passageways 64 are provided at each end of the valve to drain to the reservoir any liquid which leaks past the spools 51 or 55.

While not necessary to the present invention the pipe line 39 is preferably provided with a bleed restriction 70, and the housing of valve 15 is provided with a countersunk opening 71 communicating with the pipe line 39 but normally closed by means of a ball check valve 72 having a closing spring 73. The spring 73 is of such stiffness as to permit opening of the ball check valve 72 only after pressure in the pipe line 39 reaches the maximum safe pressure for the system. Thus in the particular example previously given, spring 73 would permit opening of the ball check valve 72 only when the pressure in the pipe line 39 exceeded a pressure in the order of 1000 pounds per square inch. The countersunk opening 71 is closed by means of a plug 74 provided with a conduit 75, which is connected to the low pressure reservoir 12. The combination of the ball check valve and the small bleed opening 70 enables the valve plunger 18 in the housing 15 to operate as a safety relief valve, inasmuch as it vents the liquid in the chamber 16 above the piston 17 to the low pressure reservoir when the pressure in the line 39 exceeds a safe value. During the relief action of the valve the bleed opening 70 insures that the pressure in line 39 will be less than that below piston 17 by an amount sufficient to overcome spring 26.

The mechanism disclosed in Figure 1 operates in the following manner. Fluid from the pump 10 flows through line 13, the valve 15 into the line 30 without restriction, as long as any one of the motors connected with the lines 40, 41, and 42 is in operation. If it be assumed that the motor connected to line 40 is in operation and that the lines 41 and 42 are blocked, a pressure drop will occur as the fluid flows through the restriction valve 33, and consequently the pressure at the righthand side of the restriction will be less than that at the left. Since, under the conditions stated, there is no flow in lines 31 or 32 the pressure in line 39 will be the same as that at the righthand side of the restriction valve 33 and, therefore, the difference in pressure at the opposite sides of the piston 17 will exactly equal the pressure drop across the valve 33. The restriction offered by the valve 33 when it is opened to its fullest extent is preferably such that the pressure drop caused by it for a flow equal to the full delivery of the pump will just be overcome by spring 26 so that the valve plunger will remain down in engagement with its seat. Thus if the valve 33 is closed to a slight degree the pressure drop across the valve will increase sufficiently to overcome spring 26, and valve plunger 18 will be raised by piston 17. This will bypass a portion of the liquid discharged by the pump through the low pressure outlet port 19 to the reservoir 12, thereby reducing the quantity of liquid supplied through pipe 30, valve 33, and line 40. The position of the valve 18 will automatically adjust itself to maintain a substantially constant pressure drop across the valve 33 and consequently the flow of a substantially constant volume of liquid for each unit of time.

It should be noted that the valve mechanism automatically maintains a uniform rate of flow independent of the total pressure in line 40. Thus, if the motor to which line 40 is connected is operating against a low resisting force, the pressure in line 40 may be quite low but the volume of liquid and the pressure drop across valve 33 will remain constant, and the pressure at the discharge of the pump 10 will only exceed the pressure in the line 40 by the relatively small pressure drop across the valve 33. If the motor to which line 40 is connected encounters a heavy resistance the pressure in that line will build up to that necessary to maintain the motor in operation at its fixed speed, and there will be no change in either the rate of flow of fluid or in the pressure drop across the valve 33. It is apparent, therefore, that the pump 10 is only required to operate against that pressure necessary to operate the motor at its desired speed plus the small pressure drop across the valve 33.

It will be apparent that by adjusting the position of the plug 36 in valve 33 the size of the restricted opening may be varied and consequently the quantity of fluid for the fixed pressure drop correspondingly varied. Adjustment of the valve, therefore, provides a simple method of adjusting the speed of the motor connected to line 40.

If it be assumed that lines 40 and 42 are blocked and that fluid is flowing through line 41, it is apparent that the pressure in line 31 at the righthand side of restriction valve 34 will be equal to the pressure delivered by the pump less the total pressure drop through the restriction valves 33 and 34. The pressure in line 31 at the righthand side of valve 34 is transmitted without change through line 32, valve 35, and pipe 39 to the upper end of the valve chamber 16 because of the fact that no flow is occurring through the valve 35. Consequently, the apparatus will function as before to maintain a fixed pressure drop across the valves 33 and 34 and consequently a uniform flow of fluid through the line 41.

It is apparent that the rate of flow of liquid through the line 41 may be adjusted by adjusting the degree of opening of throttle valve 34 without changing the adjustment on valve 33 or affecting flow through line 40 when that line is operating, so long as the quantity of fluid required in line 41 is less than that required in line 40.

When lines 40 and 41 are blocked and flow is occurring in line 42 the apparatus will operate as before to maintain a constant pressure drop across the valves 33, 34, and 35, and consequently a constant flow of liquid through line 42. Here again the rate of flow through line 42 may be adjusted by adjusting the position of the block in valve 35 without any change in the positions of valves 33 and 34, so long as the flow required for line 42 is less than that required for either of the lines 40 and 41.

The system illustrated in Figure 1 is of particular utility in cases where the plurality of motors to be operated require progressively smaller rates of fluid flow since otherwise it would not be possible to make an independent adjustment for the rate of speed of each motor. So long as the motors require different rates of flow and they are connected to the outlet port 28 of valve 15 in such manner that the motor requiring the greatest flow is connected first, the motor requiring the next greatest flow next, and so on, it is possible to independently adjust the speed of each motor by suitable manipulation of the valves 33, 34, and 35.

It will be observed that if the quantity of fluid required in line 41 is sufficient to cause an appreciable pressure drop in passage through the valve 33, any adjustment of the valve 33 which is prompted by the need to adjust flow in line 40 will effect the quantity of fluid supplied to line 41 when the line is in operation. Consequently, in that case any adjustment of the position of valve 33 will require a reverse adjustment of the valve 34 if no change is desired in the quantity of fluid to line 41. The same is true if the quantity of fluid required in line 42 is sufficient to cause an appreciable pressure drop in either valve 33 or valve 34. In some cases, therefore, it may be necessary to manipulate two or all three of the throttle valves in order to adjust the flow to one of the operating motors. Accordingly, it is preferred to employ the type of mechanism shown in Figure 1 only in cases where the flow requirements of the several motors differs to a very material degree. Thus, if for example, the motor connected to line 40 requires eighty gallons of liquid per minute, the motor connected to line 41 requires twenty gallons per minute, and the motor connected to line 42 requires five gallons per minute, no appreciable pressure drop will occur through valves 33 and 34 when the motor connected to line 42 is operating, and no appreciable pressure drop will occur in valve 33 when the motor connected to line 41 is operating. Under these circumstances the speed of operation of each motor may be adjusted by adjusting the position of a single throttle valve without in any way affecting the speed of the other three motors.

While in Figure 1 a system is illustrated for supplying three different operating motors, it will be apparent that any desired number may be connected to the system in the same manner by simply extending the series lines 30, 31, and 32 and providing one additional throttle valve for each additional branch line. It is only necessary that the pipe line 39 be connected to the series line beyond the last restriction valve. It will be apparent that the flow control mechanisms of Figures 1 through 5 would be ineffective if any appreciable flow occurred simultaneously in any two of the branch lines 40, 41, and 42, because the pressure drop through the restriction valves would not reflect the flow through either branch line. It is for that reason that the mechanism is applicable only to machines in which it is desired to control the speed of successively operating motors. As a general rule, flow through only one of the branch lines at a time will be achieved by the use of suitable selectively operable blocking valves. However, if one or more of the motors comprises a positive displacement cylinder and piston unit which engages a positive abutment at the end of its working stroke, it is unnecessary to block flow to such motor by means of a valve during operation of other motors because no flow could occur in any event after the abutment is engaged. Likewise, it is not necessary to entirely block all flow to one motor when another motor is operating, so long as the flow is so reduced that it causes no appreciable pressure drop on passing through the restriction valves.

In order to facilitate adjustment of speed, it is desirable to employ a system in which the speed of each operating motor may be adjusted by operation of a single throttle valve without altering the speed of any of the other motors. The apparatus disclosed in Figure 1 will accomplish that result only if the volume requirements of the different motors differ very materially. However, in Figure 3 is illustrated a modified multiple flow control mechanism in which this desirable result is achieved even though two of the three operating motors have volumetric capacities which do not differ materially and in which the third operating motor requires a volume of liquid materially in excess of that required by either of the other two.

Referring to Figure 3 there is disclosed a valve mechanism 80 which is identical in construction to the valve mechanism incorporated in the housing 15 of Figure 1. This valve, like that previously described, has an inlet port 81 which may be connected to a constant displacement pump and an outlet port 82 controlled by a plunger 83 having a piston 84 which is normally urged downwardly by a spring 85. The valve is provided with an outlet port 86 connected to a conduit 87 in which is provided a throttle control valve 88 identical in construction to have valve 33 in Figure 1. Connected in series with the conduit 87 is a conduit 89. A conduit 90 is in open communication with the conduit 87 beyond the throttle valve 88 and leads to the largest operating motor of the machine. A pair of branch conduits 91 and 92 are connected to the conduit 89 and conduits 91 and 92 contain adjustable throttle valves 93 and 94, respectively. The lines 91 and 92 lead, respectively, to the remaining two operating motors of the system.

Any suitable means may be provided for selectively blocking the flow in all but one of the lines 90, 91, and 92. The particular means illustrated in Figure 3 comprises three spring centered, solenoid operated, four-way valves 95, 96, and 97. These valves have a normal spring centered position for the valve spool in which position they block flow through lines 90, 91, and 92. When the solenoid 98 of valve 95 is energized, line 90 is connected to a line 99 which may lead to one end of an operating motor and a line 100, which is connected to the other end of the same operating motor, is connected to a line 101 which leads to the low pressure reservoir. When the solenoid 102 is operated, line 90 is connected to line 100 and line 99 is connected to line 101. Valves 96 and 97 operate in a similar manner. These valves may be of any desired or conventional construction. For example, they may be constructed in the manner illustrated in Fig. 9, except that they will omit port 259 of the valve illustrated in that figure.

Any desired means may be provided for controlling the sequence and direction of operation of each of the valves 95, 96, and 97, depending upon the requirements of the particular machine in which the multiple flow control mechanism is employed. For example, if the multiple flow control mechanism is employed in a shuttle-type pull broach machine having a moving work-table, these valves may be operated by means of the hydroelectric circuit disclosed in applicant's copending application, serial No. 550,330 filed concurrently herewith, now Patent No. 2,529,718, dated November 14, 1950. It is sufficient to note only that such circuit must so operate the valves 95, 96, and 97 or the machine must be of such character that at any one time no flow occurs in any two of the lines 90, 91, and 92, or the flow in all but one of them must be so reduced that it will not cause any appreciable pressure drop across the restriction valve or valves.

In some cases, as in the operation of certain broaching machines, one or more cylinders is operated in both directions to a point where it is stopped by a positive abutment, and the pressure is maintained on the cylinder to hold it in that position until it is to be returned. In such cases it is unnecessary to employ valves having a blocking position since flow to the cylinder is automatically blocked by the fact that the cylinder cannot move. A four-way valve similar to that illustrated in Fig. 12 may be substituted for any one or more of the valves 95, 96, and 97 under these circumstances.

The space within the chamber of valve 80 above the piston 84 is connected by means of a pipe line 104 containing a restricton 105 to a low-pass valve 106. The valve 106 has an internal cylindrical chamber 107 in which are formed a pair of spaced circumferential grooves 108 and 109 that are connected to the pipe line 104 by means of a passageway 110. The chamber 107 contains a valve spool having a pair of circumferential grooves 111 and 112 which are spaced axially from each other. The left-hand spool groove 111 is connected by means of a cross passage 113 and a communicating axial passage 114 to the space at the left-hand end of the spool, while the right-hand spool groove 112 is similarly connected to the space at the right-hand end of the spool by means of a cross passage 116 and an axial passage 117. The left-hand end of the valve chamber 107 is connected by means of a line 120 to the line 91 at a point beyond the adjustable throttle valve 93, and the right-hand end of the valve chamber 107 is connected by means of a line 121 to the line 92 at a point beyond the adjustable throttle valve 94. The end plates of the valve chamber are centrally recessed at 122, and an inward projection 123 of limited circumferential and radial extent acts as a stop to prevent the spool from entering the recess 122. Consequently, the entire end of the spool will be subject to the pressure applied at the adjacent end port regardless of the position of the spool.

If it be assumed that the lines 91 and 92 are blocked by means of the valves 96 and 97, or otherwise, and that flow is occurring in line 90, it will be apparent that the pressure in line 87 beyond the restriction valve 88 will be transmitted without any reduction through line 89, line 91, and line 120 to the low-pass valve 106. When the spool of valve 106 is in the left-hand position illustrated, the spool groove 111 coincides with the position of the housing groove 108 and consequently the fluid pressure in line 120 is transmitted through the passageways 114 and 113, and the passageway 110 to the line 104, which in turn is in communication with the chamber of valve 80 at a point above the piston 84. Consequently, the apparatus will maintain the pressure drop across valve 88 and, therefore, the volume of fluid flowing in line 90 at a constant value in the manner described in connection with the line 40 of the apparatus disclosed in Figure 1. The same result will be achieved if the spool of the low-pass valve 106 is at the right-hand end of its stroke during flow at line 90. In that case the pressure in line 87 beyond the throttle valve 88 will be transmitted without any reduction through lines 89, 92, and 121 to the low-pass valve 106. The spool of the valve 106 being in its right-hand position, in which position the grooves 112 and 109 lie opposite each other, the pressure in line 121 will be transmitted through passageways 117, 116, and 110 to the pipe line 104.

If lines 90 and 91 are blocked by the valves 95 and 96, or otherwise, and flow is occurring in line 92, it is apparent that the pressure drop through throttle valve 94 will result in a lower pressure in line 92 beyond the throttle valve 94 than the pressure existing in line 91 below the throttle valve 93. Consequently, the spool of the low-pass valve 106 will shift to the right, cutting off communication between lines 120 and 104 and connecting line 121 to line 104. Thus the valve in housing 80 will respond to the pressure in line 92 and maintain the pressure drop across the line 94 and, therefore, the flow through the throttle valve 94 at a constant value.

When lines 90 and 92 are blocked and flow is occurring in line 91, the pressure drop through throttle valve 93 will result in a lower pressure existing in the line 120 and consequently the spool of the low-pass valve 106 will shift to the position illustrated in the drawings in which it connects the line 120 to the line 104; thus enabling the mechanism to maintain a constant pressure drop and, therefore, a constant rate of flow through the throttle valve 93.

Inasmuch as the adjustable throttle valves 93 and 94 are connected in parallel it is apparent that adjustment of either of them will not affect the line containing the other. This enables the operator to adjust the speed of each of the two smaller motors by manipulating a single corresponding throttle valve without the necessity of adjusting the other throttle valve. If the capacity of the motors connecting the two lines 91 and 92 is materially less than that required for the motor connected to line 90 then, as previously indicated, adjustments of throttle valve 88 for the purpose of adjusting the rate of flow through line 90 will not affect the operation of the motors connected to lines 91 and 92.

It will be observed that when the motor connected to line 90 is in operation and lines 91 and 92 are blocked, the pressure transmitted by the lines 120 and 121 to the opposite ends of the low-pass valves 106 are equal and that, therefore, the spool of valve 106 will tend to remain in the position last occupied. However, there is no positive force holding it in that position and it might be possible in the event of vibration for it to shift into an intermediate position in which it would block communication between line 104 and both of the lines 120 and 121. This would render inoperative the flow control for line 90 with the result that the motor connected to line 90 would receive the full displacement of the pump. This result may be avoided by incorporating a spring pressed detent in the valve to hold the spool against movement from either of its two end positions when opposite ends of the spool are subject to the same pressure; or, as an alternative arrangement, the valve may be provided with a spring in the manner illustrated in Figure 5 in connection with the similar low-pass valve 106'. As there illustrated, the spool of the valve, which is identical in construction to that previously described, is normally urged to its left-hand position by means of a spring 125. This spring is so chosen that it will balance a pressure at the left-hand end of the low-pass valve equal to approximately one-half of the pressure differential required to open the by-pass valve in housing 80. As a result, the spool of the low-pass valve will shift to the right against the force exerted by the spring 125 when the flow is occurring in the line which is connected to the right-hand end of the low-pass valve. The only function of the spring is to insure that the spool remains at one end of the stroke when the pressure at opposite ends of the low-pass valve is equal.

It will be apparent that when it is desired to operate only two motors having volumetric capacities which are not materially different, that the flow control mechanism of Fig. 3 may be employed by simply omitting the adjustable throttle valve 88 and the branch line 90.

In some cases it is desirable to relieve the pressure on the system when none of the motors is operating. This may be readily accomplished by the mechanism illustrated in Figure 3 by simply connecting a point in the chamber of valve 80 which is located above the piston 84 to the low pressure reservoir. As shown in Figure 3, this may be accomplished by a line 130 containing a solenoid-operated blocking valve indicated diagrammatically at 131. The valve 131 normally blocks flow through valve 130 but when the solenoid 132 of valve 131 is energized the valve opens and permits unrestricted flow to the low pressure reservoir. This venting of the space above piston 84 causes the by-pass valve plunger 83 to open fully and discharge all of the liquid from the pump to the reservoir at low pressure.

In Figure 4 is illustrated a further modified multiple flow-control mechanism which may be employed where four operating motors are present and in which the speed adjustments of each are entirely independent of the adjustments of any of the others regardless of the capacity of the several motors. In this construction there is provided a valve mechanism indicated diagrammatically at 140, which is identical in construction and mode of operation to the mechanism within the housing 15 in Figure 1. Valve 140 has an inlet 141 connected to a positive displacement pump and a by-pass discharge 142 which is connected to the low pressure reservoir. The valve also has an outlet line 143 to which are connected four branch lines 144, 145, 146, and 147 containing respectively adjustable throttle valves 148, 149, 150, and 151. The lines 144 to 147 inclusive are connected to the respectively operating motors in any desired manner, such as by means of spring-centered, solenoid-operated, four-way valves which block flow in the spring-centered position and, as previously indicated, these valves may be operated by any suitable instrumentality effective to cause the valves to block flow through all but one of the four branch lines at a time. If blocking four-way valves are not employed it will be appreciated that some other means must be present to block flow in the motors whose speed is not being controlled, or of so reducing that flow that it causes no appreciable pressure drop in passing through the adjustable throttle valves.

The control line 150, which is connected to the space above the valve piston in valve 140, is connected by means of a low-pass valve 151 identical in construction to the valve 106 of Figure 3 to a pair of lines 152 and 153. Line 152 in turn is connected through a low-pass valve 154 which is preferably identical in construction to the valve 106', shown in Figure 5, to a pair of lines 155 and 156. Line 155 is connected to the conduit 144 beyond the adjustable throttle valve 148; and line 156 is connected to the conduit 145 beyond the adjustable throttle valve 149. Similarly the line 153 is connected to a low-pass valve 158 identical in construction to the valve 106', shown in Figure 5, and valve 158, in turn, is connected to a pair of lines 159 and 160. The line 159 is connected to the conduit 146 beyond the throttle valve 150, and the line 160 is connected to the conduit 147 beyond the throttle valve 151.

It will be apparent from the above that the line, of the four lines 155, 156, 159, and 160, which is connected to the conduit in which flow is occurring, will be subject to a lower pressure than the remaining three lines; that is to say, that the three lines connected to the blocked or substantially blocked conduits will be subject to the pump discharge pressure whereas the line connected to the conduit in which flow is occurring will be subject to a pressure which is less than the pump discharge pressure by the amount of the pressure drop through the adjustable restriction valve in that conduit.

The three low-pass valves 151, 155, and 158 automatically select the line containing the lowest pressure of the four and transmit that pressure to line 150, thus enabling the valve 140 to maintain the pressure drop and flow at the desired constant value. Since the four adjustable throttle valves 148, 149, 150, and 151 are connected to the system in parallel, an adjustment of any one of them will have no effect upon the others but will simply change the flow in the line in which it is positioned.

It is preferred to employ in the low-pass valves 154 and 158 a spring biasing device as shown in Figure 5, inasmuch as the conduits connected to the ends of these two low-pass valves will be at the same pressure when the conduit in which flow is occurring is one of the conduits connected to the other of the two low-pass valves 154 and 158. Since the conduits 152 and 153 connected to the low-pass valve 151 will never be at the same pressure so long as the machine is in operation, the spring may be omitted in the low-pass valve 151, if desired.

It will be understood that the operating motors employed with the multiple flow control mechanisms of the present invention may be any suitable form of positive displacement motor, the usual form being that of a piston and cylinder unit with either the piston or cylinder constituting the moving element and the other being stationary. Moreover it will be apparent that the motors may be single-acting motors with a spring or gravity return in which event they may be operated by either individual three-way valves or a composite multiple three-way valve such as that shown in Figure 1, or they may be double-acting cylinder and piston units operated by means of four-way valves, such as the valve 95 described in connection with Figure 3. Moreover, a double-acting piston and cylinder unit may, for purposes of the present invention, be considered two separate operating motors where an independent control is desired for the movement in each direction. Such an arrangement is illustrated in Figure 6.

Referring to Figure 6, there is illustrated a valve 170 which is identical in construction and mode of operation to the valve in housing 15 of Figure 1 and which has an inlet port 171, a by-pass discharge port 172 leading to the low-pressure reservoir, and an outlet port 173 connected to a conduit 174. The constant displacement pump is, of course, connected to the inlet port 171 in the manner previously indicated. A pair of branch lines 175 and 176 are connected to the conduit 174 and the branch lines contain, respectively, adjustable throttle valves 177 and 178 of the type previously described. The control line 180, which leads to the space above the by-pass valve piston in valve 170 is connected to a low-pass valve 181 identical to that illustrated in Figure 3, and the ends of the valve 181 in turn are connected to a pair of conduits 182 and 183. Conduit 182 is connected to the line 175 at a point beyond the adjustable throttle 177, and line 183 is connected to the line 176 at a point beyond the adjustable throttle valve 178.

Lines 175 and 176 are connected to a control valve 185, which is provided with a valve spool 186 and a pair of outlet ports 187 and 188. Valve 185 also has an outlet 189 which is connected to the low-pressure reservoir and which communicates with a pair of interior channels in the valve housing located at the ends of the housing and indicated by the numerals 190 and 191, the connection being effected by means of the longitudinal passageway indicated in dotted lines at 192. The valve spool is provided with three lands 193, 194, and 195 and is shifted by means of pilot pressure supplied to the ends of the valve housing by means of a pair of pilot lines 198 and 199.

When the valve spool 186 is in the position illustrated in the drawings, land 194 blocks flow through conduit 176, and flow is permitted from conduit 175 to conduit 200 which in turn is connected to the lefthand end of a cylinder 201. The righthand end of a cylinder 201 is connected at this time to the low-pressure reservoir by means of a conduit 202, channel 191, passageway 192, and the outlet line 189. When pilot pressure is applied to the righthand end of the spool 186 the spool is shifted to the left into a position in which the land 194 blocks flow through conduit 175, and flow is permitted through conduit 176 and conduit 202 to the righthand end of cylinder 201. At this time the lefthand end of the cylinder 201 is connected to the low-pressure reservoir by means of the line 200 and the outlet line 189.

Cylinder 201 contains a piston 203 having a rod 204 which drives any suitable instrumentality indicated diagrammatically at 205. Means are indicated diagrammatically for automatically shifting the valve 185 at each end of the stroke of piston 203. This means includes a lug 206 secured to the moving element 205 and effective at each end of the stroke of the piston to contact one of a pair of levers 207 and 208 which are connected by means of a link 209. The shaft on which the lever 207 is fixed, which shaft is indicated by the dotted line 110, operates a rotary four-way valve indicated diagrammatically at 211. The valve 211 has four ports; port 212 is connected to a source of liquid under pressure such as the conduit 174; port 213 is connected to low-pressure reservoir; port 214 is connected to the line 198; and port 215 is connected to the line 199. When the lever 207 is in the position illustrated the flow lines through the valve 211 are as indicated in the solid lines 216 and 217. When the lug 206 strikes the lever 208 thus shifting levers 208 and 207 clockwise, valve 211 is shifted into a position in which the flow lines are indicated by the dotted lines 218 and 219.

Accordingly, with the parts in the positions illustrated in Figure 6, pilot pressure is supplied to the lefthand end of valve 185 through line 198 and ports 214 and 212 of the valve 211, while the righthand end of the valve 185 is connected to the low-pressure reservoir through line 199 at ports 217 and 213 of the valve 211. Consequently, the fluid under pressure is being supplied from the pump through valve 170, conduits 174 and 175, the adjustable throttle valve 177, valve 185, and line 200 to the lefthand end of cylinder 201 and the piston 203 is moving to the right. When the piston reaches the righthand end of its stroke, valve 211 will be shifted and the righthand end of the valve 185 will be connected to pilot pressure through line 199 and ports 214, 215, 217, and 212 of valve 211, while the lefthand end of valve 185 will be connected to the low-pressure reservoir by line 198 at ports 214 and 213 of valve 211.

It is apparent that there is provided, in accordance with Figure 6, a multiple flow control valve mechanism incorporating means for independently adjusting the speed of the stroke of a single piston and cylinder unit in each direction of movement and in which an adjustment of the speed of operation in one direction will not affect the speed of operation in the other.

The apparatus disclosed in Figure 6 may be modified to eliminate the low-pass valve 181 and still accomplish identically the same results by altering the construction of the valve 185 in the manner illustrated in Figure 7. As there illustrated, the valve 185' is provided with a spool 186' having three lands 193', 194', and 195'. The valve is provided with a pair of inlet ports which are connected to the lines 175' and 176', which correspond to the lines 175 and 176 of Figure 6, and a pair of outlet ports 200' and 202' which lead to opposite ends of the operating cylinder and thus correspond to the lines 200 and 202 of Figure 6. The valve is also provided with an outlet port 189', which is connected with the low-pressure reservoir. Pilot lines 198' and 199' are provided for conducting the pilot pressure to operate the valve in the manner previously indicated in connection valve 185.

Valve 185' differs from valve 185 in that the former is provided with a pair of auxiliary passageways 220 and 222 which are connected directly to a line 180', which corresponds to the line 180 in Figure 6. In addition the land 194' is widened and so arranged that when it blocks flow through line 176' it also blocks flow through line 222 but leaves lines 175' and 220 in fluid communication with the line 200'. When the spool 186' is shifted from its righthand position indicated to its lefthand position the land 194' blocks flow through lines 175' and 220 and provides fluid communication between lines 222, 176', and 202'. With this exception valve 185' is identical in construction and mode of operation to the valve 185 of Figure 6.

It is apparent that when valve of Figure 7 is employed the pressure in the control line 180' will be the pressure in the motor conduit in which flow is occurring since the valve which is employed to block the other motor line also blocks communication between that motor line and the branch of the control line 180' associated therewith.

By providing blocking valves for the motor lines which also control the connection between those motor lines and the control line for the by-pass valve it is possible to omit the three low-pass valves otherwise necessary in a flow-control mechanism such as that illustrated in Figure 4. Such an arrangement is illustrated in Figures 8 and 9 wherein the valve mechanism 230, which corresponds to the mechanism within the housing 15 of Figure 1, is connected to an outlet conduit 231 having four branch lines in which are provided adjustable throttle valves 236, 237, 238, and 239 respectively. Flow through the motor lines 232, 233, 234, and 235 is controlled by means of spring-centered solenoid-operated four-way valves 240, 241, 242, and 243. The control line 245 for the valve mechanism 230 contains the usual bleed restriction indicated diagrammatically at 246, and is provided with four branches 247, 248, 249, and 250 which lead respectively to the valves 240, 241, 242, and 243. Since the latter valves are identical in construction a description of valve 240 will suffice for all.

As shown best in Figure 9 the valve 240 includes a housing having an internal generally cylindrical bore containing a spool 252 provided with three lands 253, 254, and 255. The motor line 232 is connected to an inlet port 258 and the control branch line 247 is connected to an inlet port 259. When the spool 252 is in its central position illustrated in Figure 9, land 254 blocks the ports 258 and 259, and the spool is normally held in the illustrated central position by means of a spring centering device indicated generally at 260, which is identical in construction to the spring centering device illustrated in Figure 1. The valve chamber is provided with a pair of outlet ports 262 and 263 to which are connected lines 264 and 265 respectively, which may lead to opposite ends of one of the operating motors. The valve chamber also is provided with a pair of ports 266 and 267 which are connected by means of a passageway 268 indicated in dotted lines. The port 267 is connected to a line 269 which leads to a low-pressure reservoir. Drain passages 256 and 257 are provided to conduct to the reservoir, through passageway 268, any liquid that leaks past spools 253 and 255, respectively.

It is apparent that when the solenoid 270 is energized and the spool 252 shifted thereby to the right against the action of spring-centering device 260, that ports 258 and 259 will be connected together and to the port 262, thus allowing fluid from the motor line 232 to flow to lines 264. At the same time line 265 is connected through ports 263 and 266, passageway 268 and port 267 to the low-pressure reservoir line 269. Under these circumstances the control line 245 of the valve 230 will be subject to the pressure in line 232 at a point beyond the adjustable throttle valve 236, and all of the remaining branch control lines 248, 249, and 250 will be blocked by reason of the fact that the valves 241, 242, and 243 will be in their spring-centered position. When the solenoid 271 is energized, the spool 252 is shifted in the reverse direction connecting ports 258 and 259 together and to the port 263, while line 264 will be connected to the low-pressure reservoir through ports 262, 267, and line 269. In this position also all of the remaining four-way valves 241, 242, and 243 will be spring centered by the circuit control means of the machine. It will be understood that each of the valves 241, 242, and 243 is similiar in construction and mode of operation to the valve 240 and that the outlets of each lead to opposite ends of the remaining operating motors of the system, respectively.

The four-way valves of the multiple flow control mechanism of Figure 8 may be controlled by any suitable means which will insure that flow is permitted through only one of the four-way valves at a time. The sequence of the operation of the various valves will depend upon the requirements of the machine in which the apparatus is employed. It will also be understood that any desired number of branch motor lines may be connected to the main line 231. If only three branch lines are employed the four-way valves may be operated by means of the hydroelectric control circuit for a broaching machine illustrated in applicant's copending application, Serial No. 550,330, filed concurrently herewith.

If one or more of the motors is operated against a positive abutment at both ends of its stroke, or if the flow of liquid to any such motor during the period in which the mechanism is controlling the speed of another motor is so reduced by other means that it causes no appreciable pressure drop across the adjustable throttle valve for such motor, the spring centering device may be omitted from the four-way valve of Fig. 9 which is associated with such motor, since the valve need not have a blocking position.

The control lines for the by-pass valve of the multiple flow-control mechanism may also be controlled by special valves responsive to the existence of flow in the motor lines. Such flow-responsive valves will connect the motor line, in which flow is occurring, to the main control line of the system, and disconnect the control line from the motor line either upon a stoppage of flow or a predetermined decrease in the rate of flow. Such a system is illustrated more or less diagrammatically in Figures 10 and 12 inclusive.

Referring to Figure 10 there is illustrated a valve mechanism 280 similar to the mechanism within the housing 15 of Figure 1. The valve mechanism 280 has an inlet line 281, a by-pass discharge line 282, and a main discharge line 283 similar to the corresponding lines connected to housing 15 in Figure 1. The valve 280 also has a control line 284 similar in construction and function to the line 39 of Figure 1. The control line 284 may include a bleed restriction indicated diagrammatically at 285, if desired.

Figure 12:
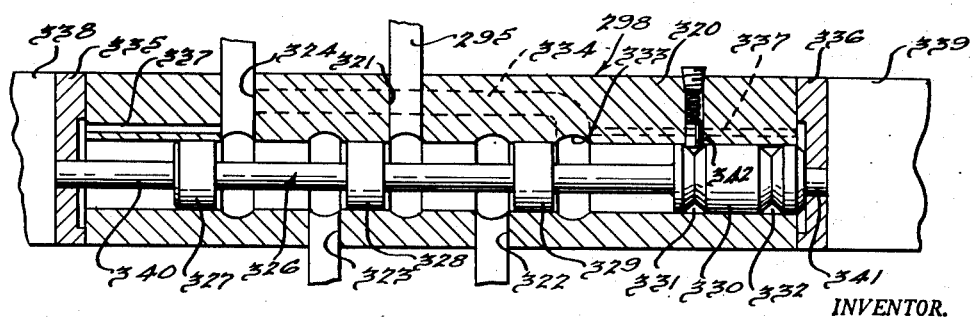
Figure 12 is a sectional view of another of the valves which may be employed in the form of invention illustrated in Figure 10.

The discharge line 283 may have any desired number of branch lines leading to the hydraulic motors of the machine in which the system is used. Three such lines, indicated at 286, 287, and 288, are illustrated in Figure 10. Each of these lines contains an adjustable restriction valve 289, 290, and 291 respectively, each similar to the restriction valve 33 of Figure 1, and the lines are connected to the inlet ports of flow-responsive valves 292, 293, and 294, respectively. The outlet ports of the flow-responsive valves are in turn connected by lines 295, 296, and 297 to any suitable control valves for the three motors of the system. The particular valves, illustrated diagrammatically in Figure 10 and in section of Figure 12, are four-way valves 298, 299, and 300, each of which controls the passage of fluid under pressure to one end of a hydraulic motor and the discharge of fluid from the opposite end.

The flow-responsive valves 292, 293, and 294 may be of any desired construction so long as they are effective to connect the branch control lines 301, 302, and 303 to their respective branch motor lines when flow occurs in the latter. Thus, for example, the valve 292 must operate, when flow is occurring through the branch motor line 286, to connect the branch control line 301 to the branch motor line 286, and it must serve to disconnect line 301 from line 286 when no flow is occurring in the latter or when the flow in the latter falls below a predetermined amount. One satisfactory valve for performing the foregoing functions is illustrated in section in Figure 11. It will be appreciated that all three of the flow-responsive valves may be of identical construction.

Figure 11:
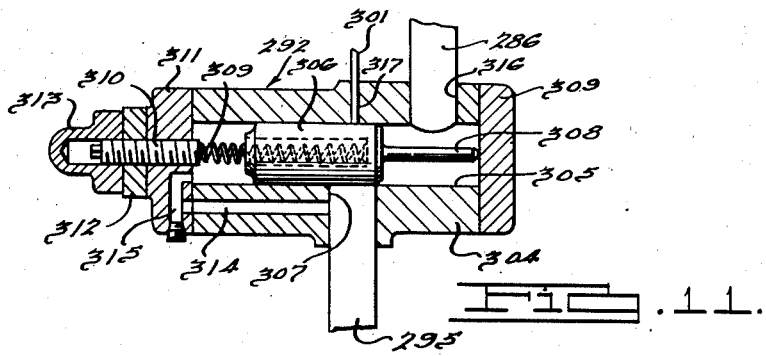
Figure 11 is a sectional view of one of the valves employed in the mechanism of Figure 10.

Referring to Figure 11 the flow-responsive valve comprises a housing 304 having a generally cylindrical bore 305 in which is slidable a cylindrical valve element 306 adapted to control communication between the interior bore and both the discharge port 307 and the control line 301. The valve element 306 is provided with a stem 308 of reduced diameter which engages the end plate 309 of the valve to limit movement of the valve element 306 toward the right, as viewed in the drawing, to the position there illustrated. The valve element 306 is normally held in the position illustrated, in which it completely closes the discharge port 307, by means of a relatively light spring 309, the tension of which may be adjusted by means of a threaded adjusting plug 310. The plug 310 is threaded into an opening in the end plate 311 and may be locked in any desired adjusted position by means of a lock nut 312. An internally threaded cap 313 covers the end of the adjusting plug 310 and seals the valve housing. The discharge port 307 is in constant communication with the left-hand end of the bore of the valve housing by means of a passageway 314 in the valve housing and a communicating passageway 315 in the end plate 311. The inlet pipe 286 is in constant communication with the right-hand end of the bore of the valve housing by means of a port 316. The control line 301 is connected to a port 317 which, in the normal or inoperative position of the valve, is closed by means of the valve element 306.

The valve 292 operates to permit substantially unrestricted flow from line 286 to line 295 by reason of the fact that the valve element 306 will automatically assume a position in which the pressure drop past the discharge port 307 is balanced by the force exerted by spring 309, and the latter spring is preferably made quite weak so that the valve will offer very little resistance to the flow. This operation results from the fact that the pressure at the discharge port 307 is in communication with the left-hand end of the valve element 306 and, consequently, the valve element is balanced except for the light force exerted by the spring 309. As a result of this arrangement, the element 306 will assume a position in which the pressure at its right-hand end, which is the pressure at the inlet port 316, exceeds the pressure at its left-hand end, which is the pressure at the outlet port 307, only by the amount necessary to overcome the spring 309. This action by the valve is independent of variations in the pressure in line 295 so long as the maximum operating pressure of the system is not reached. However, if line 295 is entirely blocked the valve element 306 will close the discharge port 307 because in the absence of flow no pressure drop can occur through the discharge port to counterbalance the force of spring 309. The valve element 306, in closing discharge port 307, likewise closes port 317 connected to the branch control line 301, thereby disconnecting that line from the motor line 286. The valve thus operates automatically to connect the branch control line to the motor line only when normal flow is occurring in the latter. Consequently, so long as flow is occurring in only one motor line at a time the pressure in the main control line 284 will be that exiscting at a point beyond the restriction valve in the motor line in which flow is occurring, and the multiple flow-control mechanism will operate as previously described in connection with the earlier modifications of the invention.

While the valves 298, 299, and 300 may be of any desired construction and may, for example, be spring centered blocking center four-way valves, like the valve illustrated in Fig. 9 (but omitting port 259 of the latter), it is not necessary that these valves perform a blocking function if other means are present to block or reduce flow through all lines except the one in which at any given time the rate of flow is being controlled. Thus, if one or more of the motors is operated against a positive abutment at each end of its stroke, the valve may be constructed in the manner illustrated in Fig. 12.

As shown in Fig. 12, the valve 298 comprises a more or less conventional solenoid-operated four-way valve having a detent to retain it in either one of its two positions. The valve comprises a generally cylindrical body 320 having a cylindrical bore. The pressure line 295 is connected to a port 321, and the valve is provided with two discharge ports 322 and 323 and a reservoir or return port 324. Positioned within the bore of the valve is a spool indicated generally at 326 having four lands 327, 328, 329, and 330. The land 330 is provided with a pair of axially spaced, V-shaped, annular grooves 331 and 332 adapted to co-operate with a spring-pressed detent which serves to hold the spool in either one of two axial positions of adjustment. In the position of the valve spool illustrated, port 321 is in communication with port 322, and port 323 is in communication with return port 324. In addition, the return port is connected to the space between lands 329 and 330 by means of an annular groove 333 within the valve body and a communicating passageway 334 shown in dotted lines in the drawing. The ends of the valve housing are closed by means of end plates 335 and 336, and the spaces at the outer ends of the spool are connected to the return port 324 by means of leakage passages 337. The valve is provided with a pair of solenoids indicated diagrammatically at 338 and 339 which are adapted to engage and operate the valve spool by means of projecting spool portions 340 and 341.

In the position illustrated, the spool has been shifted to the right by energization of one of the solenoids and is being retained in that position by means of the detent 342. The detent will serve to hold the spool in the position illustrated, even though neither solenoid is energized. When the other solenoid is energized, the spool is shifted to the left, thereby connecting ports 321 and 323 and connecting port 322 to the reservoir or return port 324. In this position the detent 342 will enter groove 332 in the spool to hold it in its left-hand position. It will be noted that in neither position does the valve block flow from the line 295 to the branch motor lines 322 and 323 which may lead to opposite ends of the same piston and cylinder unit.

As previously indicated, the forms of invention illustrated in Figs. 1 through 9 are effective to control the speed of one motor unit, even though at the same time another motor unit is receiving a small quantity of liquid, provided the quantity is so small that it does not effect an appreciable pressure drop through its associated adjustable throttle valve. The mechanism of Figs. 10 to 12 has the further advantage that it will operate satisfactorily, even though a greater quantity of liquid is flowing to one of the motors whose speed is not being controlled, as long as that quantity is less than the amount required by that motor when its speed is being controlled by the mechanism. This function results from the fact that it is possible, by selecting the location of port 317 of valve 292 relative to the discharge port 307, to cause the valve element 306 to block the port 317 before the discharge port 307 is closed. The arrangement of the ports may be so chosen that port 317 is closed, while port 307 is open to any desired degree less than the opening which will occur during the period in which the motor associated with the valve is operated at a controlled speed by the mechanism previously described. It will be appreciated, however, that as in the prior modifications, the mechanism controls the speed of operation of only one motor at a time, and consequently additional means are required to restrict the flow through the line to any motor during the period in which the speed of operation of another motor is being controlled by the mechanism. Such means may be a throttle valve or a fixed or moving abutment for the motor.

The flow control mechanisms of the present application are of general utility for use in any hydraulic apparatus incorporating a plurality of separate operating motors.

In addition, as will be apparent, the multiple motor lines may be connected to the same motor at different times in order to provide different rates of flow for different portions of the stroke of the same motor. In such case a single motor may, in effect, act as a plurality of successively operated motors of different capacities. The flow control mechanisms of Figures 1 through 6, 10 and 11 may be manufactured and sold for employment in hydraulic machinery generally, independent of the means employed in the machinery for selectively blocking the lines to the several operating motors. For this purpose it is obvious that, if desired, the mechanism incorporated in any of the main control valve housings 15, 80, 140, 170, or 280 may be incorporated in a single casing with any or all of the adjustable throttle valves and the control valve lines for that valve, including such low-pass valves or flow-responsive valves as are required. The purchaser may then simply connect the several motors to the outlets provided in the housing and incorporate the necessary blocking valves in the motor lines. These blocking valves may be operated by any desired means either automatically in a desired sequence or manually or a combination of both, as the character of the machine requires.

The type of multiple flow control mechanism disclosed in connection with Figures 7 to 9, inclusive, is not complete without the blocking valves, and thus the blocking valves may either be incorporated in the same housing with the remaining structure or suitable additional ports may be provided by which the purchaser may connect the branch control lines from the blocking valves to the control passages in the housing. Certain of the claims recite means for selectively blocking flow through all but one of the branch motor lines at a time, or means for permitting flow through only one line at a time, or similar recitations. It will be understood that such recitations are intended to cover blocking means for the inactive branches even though they do not block all flow, so long as they so reduce the quantity of liquid flowing that it causes no appreciable pressure drop across any of the restriction valves through which it passes.

While in the various modifications illustrated and described the valve mechanism is shown employed in a hydraulic system in which the pump receives its supply of liquid from a reservoir, it will be appreciated that in certain types of systems the various hydraulic motors may discharge directly to the intake of the pump without passing through a reservoir, if desired.

While several forms of the multiple flow-control mechanism are illustrated and described it will be apparent that further variations in the arrangement and design of the various parts of the mechanism may be indulged in within the spirit of the invention and scope of the appended claims.

What is claimed is:

1. A multiple flow control valve mechanism for use in controlling the operation of a plurality of successively operable fluid motors from a fluid pressure source consisting of a constant displacement pump, said mechanism including a control valve having a housing containing a valve plunger provided with a piston which divides the interior of the housing into two separate chambers, one of said housing chambers having an inlet port adapted to be connected to a source of fluid under pressure and a low pressure discharge port, said discharge port being controlled by said plunger; means defining a passageway leading from said inlet port to the other housing chamber, said passageway containing a plurality of spaced restrictions in series, the succeeding downstream restrictions being no greater in flow area than the preceding restrictions, a spring acting to cause said plunger to move in a direction to close said discharge port when the difference in pressure between said chambers tends to fall below a predetermined amount, a plurality of outlet passageways connected to said first mentioned passageway, the points of connection of said outlet passageways with the first passageway being located one beyond each of said restrictions in the direction of flow, and means for selectively blocking flow through all but one of said paths.

2. A multiple flow control valve mechanism for use in controlling the operation of a plurality of successively operable fluid motors from a fluid pressure source consisting of a constant displacement pump, said mechanism including a control valve having a housing containing a valve plunger provided with a piston which divides the interior of the housing into two separate chambers, one of said housing chambers having an inlet port adapted to be connected to a source of fluid under pressure and a low pressure discharge port, said discharge port being controlled by said plunger, means defining a passageway leading from said inlet port to the other housing chamber, said passageway containing a plurality of spaced restrictions in series, the succeeding downstream restrictions being no greater in flow area than the preceding restrictions, a spring acting to cause said plunger to move in a direction to close said discharge port when the difference in pressure between said chambers tends to fall below a predetermined amount, and a plurality of outlet passageways connected to said first mentioned passageway, the points of connection of said outlet passageways with the first passageway being located one beyond each of said restrictions in the direction of flow.

3. A multiple flow control valve mechanism for use in controlling the operation of a plurality of successively operable fluid motors from a fluid pressure source consisting of a constant displacement pump, including a control valve having a housing containing a valve plunger provided with a piston which divides the interior of the housing into two separate chambers, one of said housing chambers having an inlet port adapted to be connected to a source of fluid under pressure and a low pressure discharge port, said discharge port being controlled by said plunger, means defining a passageway leading from said inlet port to the other housing chamber, said passageway containing a plurality of spaced restrictions in series, each restriction being of greater restrictive effect than the preceding restriction progressively along said passageway in a direction of liquid flow, a spring acting to cause said plunger to move in a direction to close said discharge port when the difference in pressure between said chambers tends to fall below a predetermined amount, and a plurality of outlet passageways connected to said first mentioned passageway, the points of connection of said outlet passageways with the first passageway being located one beyond each of said restrictions in the direction of the flow.

4. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path defining a restricted opening of a size determined by the rate of flow desired in said path, independent means for adjusting each of said restrictions means providing an open liquid communication between said inlet port and that side of the piston of the differential pressure means at which pressure tends to open the valve, and means associated with the conduit paths for subjecting the opposite side of said piston to the pressure existing beyond the restriction in the conduit path in which liquid flow is occurring and means for selectively blocking flow through all but one of said paths.

5. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths connected in parallel in constant communication with said inlet port, a restriction in each conduit path, defining a restricted opening of a size determined by the rate of flow desired in said path, means providing an open liquid communication between said inlet port and that side of the piston of the differential pressure means at which pressure tends to open the valve, and means associated with the conduit paths for subjecting the opposite side of said piston to the pressure existing beyond the restriction in the conduit path in which liquid flow is occurring and means for selectively blocking flow through all but one of said paths.

6. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring nomally acting to close said by-pass valve and effective to hold said valve closed against a predetermined differential pressure applied to said differential pressure means, means defining a plurality of conduit paths in constant communication with said inlet port, a restriction in each conduit path, means for independently adjusting said restrictions, means providing an open liquid communication between said inlet port and that side of the piston of the differential pressure means at which pressure tends to open the valve, and means associated with the conduit paths for subjecting the opposite side of said piston to the pressure existing beyond the restriction in the conduit path in which liquid flow is occurring.

7. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths connected in parallel in constant communication with said inlet port, a restriction in each conduit path, means for independently adjusting said restrictions, means providing an open liquid communication between said inlet port and that side of the piston of the differential pressure means at which pressure tends to open the valve, and means associated with the conduit paths for subjecting the opposite side of said piston to the pressure existing beyond the restriction in the conduit path in which liquid flow is occurring.

8. A multiple flow control valve mechanism for use with a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path defining a restricted opening of a size determined by the rate of flow desired in said path, means for independently adjusting said restrictions, means providing an open liquid communication between said inlet port and that side of the piston of the differential pressure means at which pressure tends to open the valve, means for selectively blocking flow through all but one of said paths, and means associated with the conduit paths for subjecting the opposite side of said piston to the pressure existing beyond the restriction in the path through which liquid flow is occurring.

9. A multiple flow control valve mechanism for use with a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path, means for independently adjusting said restrictions, means providing an open liquid communication between said inlet port and that side of the piston of the differential pressure means at which pressure tends to open the valve, means for selectively blocking flow through all but one of said paths, and means associated with the conduit paths for subjecting the opposite side of said piston to the pressure existing beyond the restriction in the path through which flow is occurring.

10. A multiple flow control valve mechanism for use with a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths connected in parallel in constant communication with said inlet port, a restriction in each conduit path, defining a restricted opening of a size determined by the rate of flow desired in said path, means providing an open liquid communication between said inlet port and that side of the piston of the differential pressure means at which pressure tends to open the valve, means for selectively blocking flow through all but one of said paths, and means for subjecting the opposite side of said piston to the pressure existing beyond the restriction in the unblocked conduit path.

11. A multiple flow control valve mechanism for use with a fluid pressure consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths connected in parallel in constant communication with said inlet port, a restriction in each conduit path, means for independently adjusting said restrictions, means providing an open liquid communication between said inlet port and that side of the piston of the differential pressure means at which pressure tends to open the valve, means for selectively blocking flow through all but one of said paths, and means for subjecting the opposite side of said piston to the pressure existing beyond the restriction in the unblocked conduit path.

12. A multiple flow control valve mechanism for use with a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path defining a restricted opening of a size determined by the rate of flow desired in said path, means for independently adjusting each of said restrictions, means providing an open liquid communication between said inlet port and that side of the piston of the differential pressure means at which pressure tends to open the valve, a liquid conducting conduit connected to said differential pressure means at the opposite side of said piston, a plurality of branch conduits connecting said last mentioned conduit with said plurality of conduit paths respectively at points beyond the restrictions therein, valve means for selectively blocking flow through all but one of said conduit paths, and means operable automatically to block flow through all of said branch conduits except the one connected to the unblocked conduit path.

13. A multiple flow control valve mechanism for successively maintaining a different predetermined rate of flow through each of a plurality of conduits supplied by a fluid pressure source consisting of a constant displacement pump, said mechanism including a housing having an inlet port and a by-pass valve adapted to by-pass to low pressure a portion of the liquid which enters said inlet port, a plurality of parallel conduits in constant communication at one end with said inlet port, and means responsive to the pressure drop incident to flow of liquid through a portion of each conduit as flow occurs therein for so controlling the degree of opening of said by-pass valve as to maintain said flow at the predetermined rate for each conduit, said last named means being automatically operable to respond to the pressure drop in only one conduit at a time.

14. A multiple flow control valve mechanism for successively maintaining a different predetermined rate of flow through each of a plurality of conduits supplied by a single fluid pressure source consisting of a constant displacement pump, said mechanism including a housing having an inlet port and a by-pass valve adapted to by-pass to low pressure a portion of the liquid which enters said inlet port, a plurality of parallel conduits in constant communication at one end with said inlet port, and means responsive to the pressure drop incident to flow of liquid through a portion of each conduit as flow occurs therein for so controlling the degree of opening of said by-pass valve as to maintain said flow at the predetermined rate for each conduit, said last named means being automatically operable to respond to the pressure drop in only one conduit at a time, and independent means for adjusting the resistance to flow offered by each of said conduit portions for adjusting the predetermined rate of flow maintained by said mechanism in each path.

15. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path, defining a restricted opening of a size determined by the rate of flow desired in said path, means for independently adjusting each of said restrictions means providing an open liquid communication between said inlet port and that side of the piston of the differential pressure means at which pressure tends to open the valve, and means for subjecting the opposite side of said piston to the pressure in each of said conduit paths at a point beyond the restriction therein when liquid is flowing in said path at a rate in excess of a predetermined rate of flow.

16. A multiple flow control valve mechanism for use in controlling the operation of a plurality of successively operable fluid motors from a fluid pressure source consisting of a constant displacement pump, said mechanism including a housing having an inlet port and a by-pass valve for by-passing to low pressure a portion of the liquid which enters said inlet port, differential pressure means including a cylinder and piston for controlling the degree of opening of said by-pass valve, a spring normally acting to close said by-pass valve and effective to hold said valve closed against a predetermined differential pressure applied to said differential pressure means, means defining a plurality of conduit paths in constant communication with said inlet port, a restriction in each conduit path, defining a restricted opening of a size determined by the rate of flow desired in said path, means for independently adjusting each of said restrictions means providing an open liquid communication between said inlet port and that side of the piston of the differential pressure means at which pressure tends to open the valve, and means for each conduit path including a normally closed valve operable in response to the existence of a predetermined flow through said path to open and subject the opposite side of said piston to the pressure existing beyond the restriction in the unblocked conduit path.

BENEDICT WELTE.

REFERENCES CITED

The following references are of record in the file of this patent:

UNITED STATES PATENTS

| Number | Name | Date |
|---|---|---|
| 2,102,865 | Vickers | Dec. 21, 1937 |
| 2,157,707 | Keel | May 9, 1939 |
| 2,259,636 | Harrington | Oct. 21, 1941 |
| 2,263,779 | Jeffrey | Nov. 25, 1941 |
| 2,306,382 | Fink | Dec. 29, 1942 |
| 2,318,851 | Griffith | May 11, 1943 |
| 2,354,634 | Griswold | July 25, 1944 |

FOREIGN PATENTS

| Number | Country | Date |
|---|---|---|
| 12,925 | Great Britain | of 1901 |